(12) United States Patent
Konchan et al.

(10) Patent No.: US 8,196,974 B2
(45) Date of Patent: Jun. 12, 2012

(54) VEHICLE DOOR LATCH ASSEMBLY

(75) Inventors: Jeffrey L. Konchan, Romeo, MI (US); Frank J. Arabia, Jr., Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 969 days.

(21) Appl. No.: 12/145,009

(22) Filed: Jun. 24, 2008

(65) Prior Publication Data

US 2009/0033104 A1 Feb. 5, 2009

Related U.S. Application Data

(60) Provisional application No. 60/953,522, filed on Aug. 2, 2007.

(51) Int. Cl.
*E05C 3/06* (2006.01)

(52) U.S. Cl. ......................... 292/216; 49/503; 296/146.7

(58) Field of Classification Search .................. 292/216, 292/201; 49/502, 503; 296/146.1, 146.5, 296/146.6, 146.7
See application file for complete search history.

(56) References Cited

U.S. PATENT DOCUMENTS

| | | | | |
|---|---|---|---|---|
| 4,848,829 A | * | 7/1989 | Kidd | 296/152 |
| 5,316,364 A | * | 5/1994 | Ohya | 296/146.5 |
| 5,570,922 A | * | 11/1996 | DeRees et al. | 296/146.6 |
| 5,584,144 A | * | 12/1996 | Hisano | 49/502 |
| 5,902,004 A | * | 5/1999 | Waltz et al. | 296/146.9 |
| 5,904,002 A | * | 5/1999 | Emerling et al. | 49/502 |
| 5,924,872 A | * | 7/1999 | Takiguchi et al. | 439/34 |
| 6,076,882 A | * | 6/2000 | Szerdahelyi et al. | 296/146.1 |
| 6,135,778 A | | 10/2000 | Ubelein | |
| 6,185,872 B1 | * | 2/2001 | Seeberger et al. | 49/502 |
| 6,375,234 B1 | * | 4/2002 | Brackmann et al. | 292/1 |
| 6,409,250 B1 | * | 6/2002 | Schultheiss | 296/146.7 |
| 6,457,753 B1 | * | 10/2002 | Wegge | 292/216 |
| 6,892,496 B1 | * | 5/2005 | Youngs et al. | 49/506 |
| 6,983,978 B2 | * | 1/2006 | Radu et al. | 296/146.7 |
| 7,243,961 B2 | * | 7/2007 | Fukunaga et al. | 292/216 |

* cited by examiner

*Primary Examiner* — Gary Estremsky

(57) ABSTRACT

A vehicle door and a vehicle door latch assembly is disclosed. The vehicle door includes a door outer panel; a door inner panel affixed to the door outer panel and defining a door wet cavity, with the door inner panel including an access hole; and a door trim panel mounted to the door inner panel and defining a door dry cavity. A door latch is located in the door wet cavity; a latch locking lever is exposed to the door dry cavity and shielded from the door wet cavity, with the latch locking lever engaging the door latch; and a lock rod has a first end attached to the latch locking lever, with the lock rod extending through the access hole and between the door inner panel and the door trim panel, whereby the lock rod is not exposed to the door wet cavity.

14 Claims, 3 Drawing Sheets

VEHICLE DOOR LATCH ASSEMBLY

CROSS REFERENCE TO RELATED APPLICATIONS

This application claims the benefit of U.S. Provisional Application No. 60/953,522, filed Aug. 2, 2007, which is incorporated herein by reference.

BACKGROUND OF INVENTION

The present invention relates generally to vehicle door lock assemblies.

Conventional vehicle doors, particularly those with movable window glass, often have an inside manual lock button. The inside manual lock button extends upward through a hole in the door trim panel, allowing one to manually unlock the door from inside the vehicle by grasping and pulling up on this button, or lock the door by pushing down on the button. The lock button connects to a lock mechanism on the door latch via a lock rod and an inside locking lever. The lock rod is attached to the lock button, and extends downward between the door trim panel and a door inner panel—in a dry area of the door. The lock rod then bends and extends outboard through a grommet mounted in the door inner panel, before bending again to extend down to the inside locking lever, which is mounted to the door latch. This lower portion of the lock rod and inside locking lever are, consequently, mounted between the door inner panel and a door outer panel—in a wet area of the door. The wet area is called this because water on the movable window glass or water leaking between the glass and window seals can get into this part of the door.

There are disadvantages in having the lock rod extend through a grommet and having the inside locking lever in a wet area of the door. For example, extending through the grommet may create a leak path allowing water to travel through the grommet from the wet area to the dry area. Also, the change of direction in the lock rod as it transitions from extending vertically in the wet area to more horizontal (in order to pass through the grommet) creates a feature that allows for easier unlocking by thieves who slide a device along the window glass to engage the rod at this location. Thus, an additional cover may be needed to prevent this type of unlocking. In addition, with the inside locking lever being located in the wet cavity, it may be subject to freezing issues during cold weather. Moreover, with the lock rod attaching to the inside locking lever between the inner and outer door panels, blind assembly of the two may be required at a vehicle assembly plant.

SUMMARY OF INVENTION

An embodiment contemplates a vehicle door comprising a door outer panel; a door inner panel affixed to the door outer panel and defining a door wet cavity therebetween, with the door inner panel including an access hole; and a door trim panel mounted to the door inner panel and defining a door dry cavity between the door trim panel and the door inner panel. The vehicle door may also include a door latch located in the door wet cavity; a latch locking lever exposed to the door dry cavity and shielded from the door wet cavity, with the latch locking lever operatively engaging the door latch; and a lock rod having a first end attached to the latch locking lever, with the lock rod extending through the access hole and between the door inner panel and the door trim panel toward a second end spaced from the latch locking lever, whereby the lock rod is not exposed to the door wet cavity.

An embodiment contemplates a vehicle door latch assembly for use with a vehicle door having a door outer panel and a door inner panel having an access hole. The vehicle door latch assembly may comprise a door latch housing configured to be located between the door outer panel and the door inner panel and including a flange defining a pass-through chamber configured to be adjacent to the access hole; a seal extending around a periphery of the flange, with the seal configured to be in sealing engagement between the door inner panel and the door latch housing; a latch locking lever located in the pass-through chamber; and a lock rod having a first end attached to the latch locking lever, with the lock rod adapted to extend through the access hole.

An advantage of an embodiment is that the inside locking lever is located in the door dry cavity, and so is protected from potential freezing issues.

An advantage of an embodiment is that the lock rod, being located entirely inboard of the door inner panel, is protected from theft attempts. A thief sliding a tool between the inside of the window glass and the door inner panel will no longer be able to engage the lock rod or inside locking lever in an attempt to unlock the door. This also eliminates the need for any type of anti-theft shielding to be mounted near the lock rod, which may save cost and assembly time.

An advantage of an embodiment is that a lock rod grommet mounted in the door inner panel is no longer needed. This may reduce costs and eliminates a potential leak path for water between the door wet cavity and the door dry cavity. Elimination of the grommet may also reduce the inside manual lock button operating effort and improve the feel when manually unlocking the door latch, as well as reduce the load on a power lock motor.

An advantage of an embodiment is that assembly of the lock rod to the inside locking lever may be easier. The inside locking lever and lock rod are now located on the inboard side of the door inner panel (rather than located between the door inner and outer panels as is conventional) making assembly of the lock rod to inside locking lever easier during vehicle assembly since blind assembly is no longer required. Moreover, an electrical connector may also be received through the same access hole in the door inner panel, thus reducing the cost and complexity of routing and sealing a wiring harness extending through the door inner panel that connects to the electrical connector.

DETAILED DESCRIPTION

Figure 1:
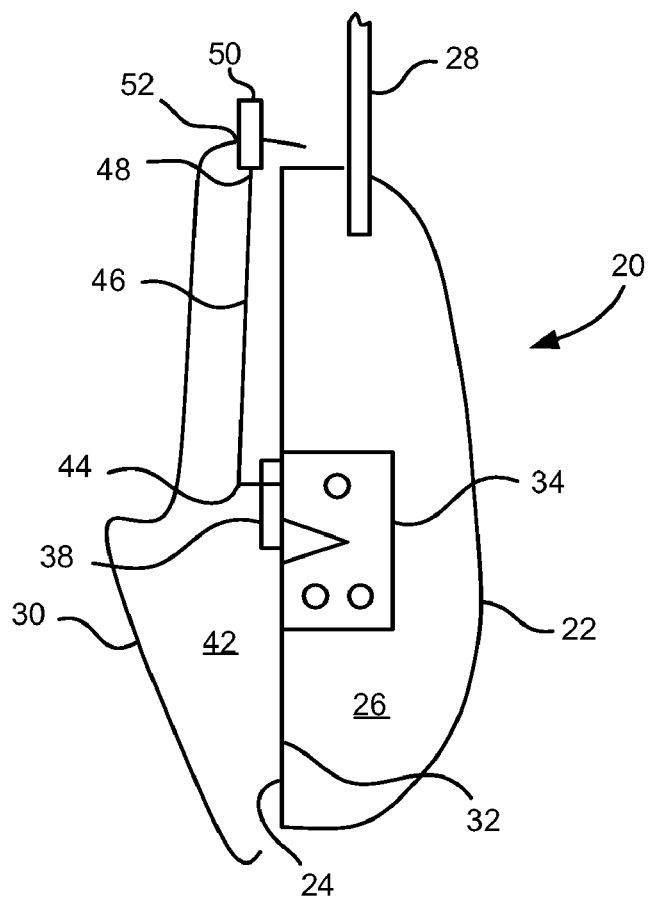
FIG. 1 is a schematic end view of a portion of a vehicle door.
Figure 2:
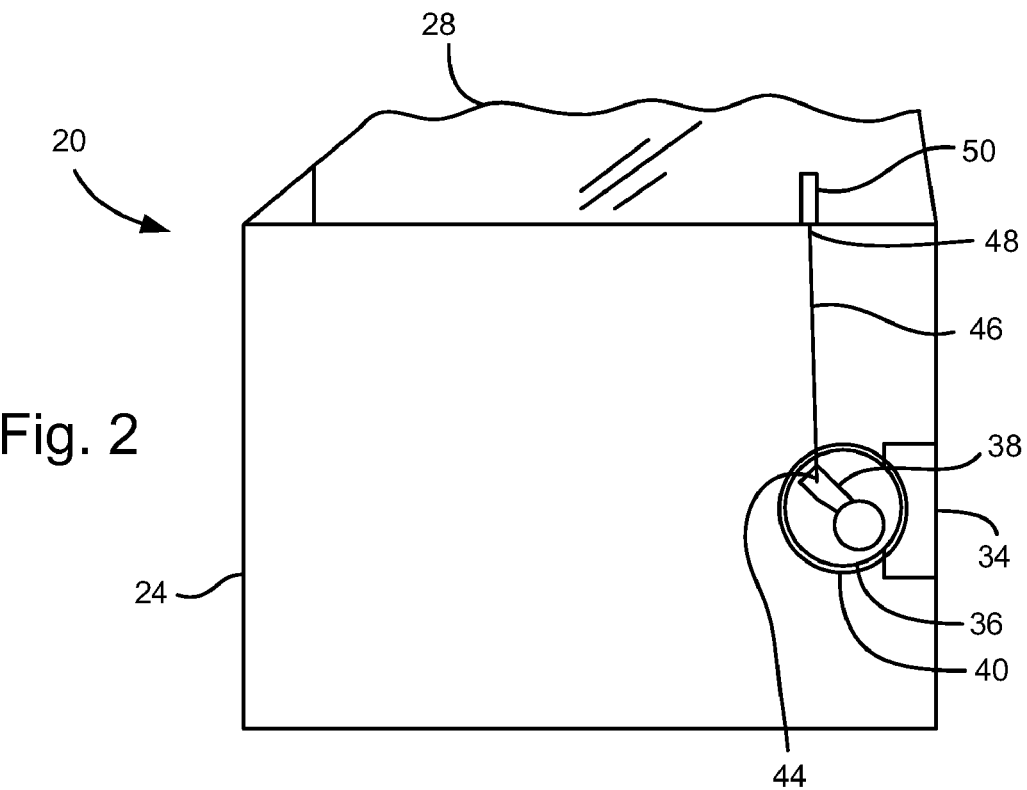
FIG. 2 is schematic side view of a portion of the vehicle door.

Referring to FIGS. 1-2, a vehicle door, indicated generally at 20, is shown. The vehicle door 20 may be a side door or other hinged door on a vehicle that includes a movable window and a lock mechanism. The vehicle door 20 includes a door outer panel 22, forming an outboard surface of the door 20, and a door inner panel 24, which is inboard of the door outer panel 22. The door outer and inner panels 22, 24 are secured together to form a door wet cavity 26. A movable window glass 28 mounts between the door outer and inner panels 22, 24 and can slide up and down in the door wet cavity 26. With the window 28 being able to slide up and down, water can relatively easily get into the wet cavity 26.

A door trim panel 30 mounts on the inboard side of the door inner panel 24. The door inner panel 24 is sealed, forming a door seal surface 32 that prevents water in the door wet cavity 26 from passing through the door inner panel 24. Thus, a door dry cavity 42 is defined between the door inner panel 24 and the door trim panel 30.

A door latch 34 is mounted to the door 20 between the door outer and inner panels 22, 24. The door latch 34 includes a portion that is adjacent to an access hole 36 in the door inner panel 24. A latch locking lever 38 operatively engages and extends from the door latch 34. The latch locking lever 38 is pivotable relative to the door latch 34 to cause locking and unlocking of the door latch 34. A latch-to-inner panel seal 40, which may be made of foam, rubber or other suitable material, is located around the periphery of the access hole 36 in order to prevent water from entering the door dry cavity 42 from the door wet cavity 26 via the access hole 36.

A lower end 44 of a sill lock rod 46 attaches to the latch locking lever 38, while an upper end 48 of the sill lock rod 46 attaches to an inside manual lock button 50. The lock button 50 extends through a hole 52 in the door trim panel 30 to allow for access by a vehicle occupant. One will note that the lock button 50 and the sill lock rod 46 are both located inboard of the door seal surface 32, and thus are within the dry cavity 42. Also, the latch locking lever 38 is not exposed to moisture in the wet cavity 26 and the sill lock rod 46 is not accessible by a thief's tool slid into the door 20 along the window glass 28.

Manual operation of the lock button 50 will not appear any different to a vehicle occupant than with prior lock assemblies. The force of pulling up or pushing down on the lock button 50 will cause the sill lock rod 46 to pivot the latch locking lever 38, thus actuating a door locking mechanism (not shown) inside of the door latch 34. For power locking operations, an actuator (not shown) in the door latch 34 will rotate the latch locking lever 38, in turn causing the sill lock rod 46 to move up or down (as the case may be).

Figure 3:
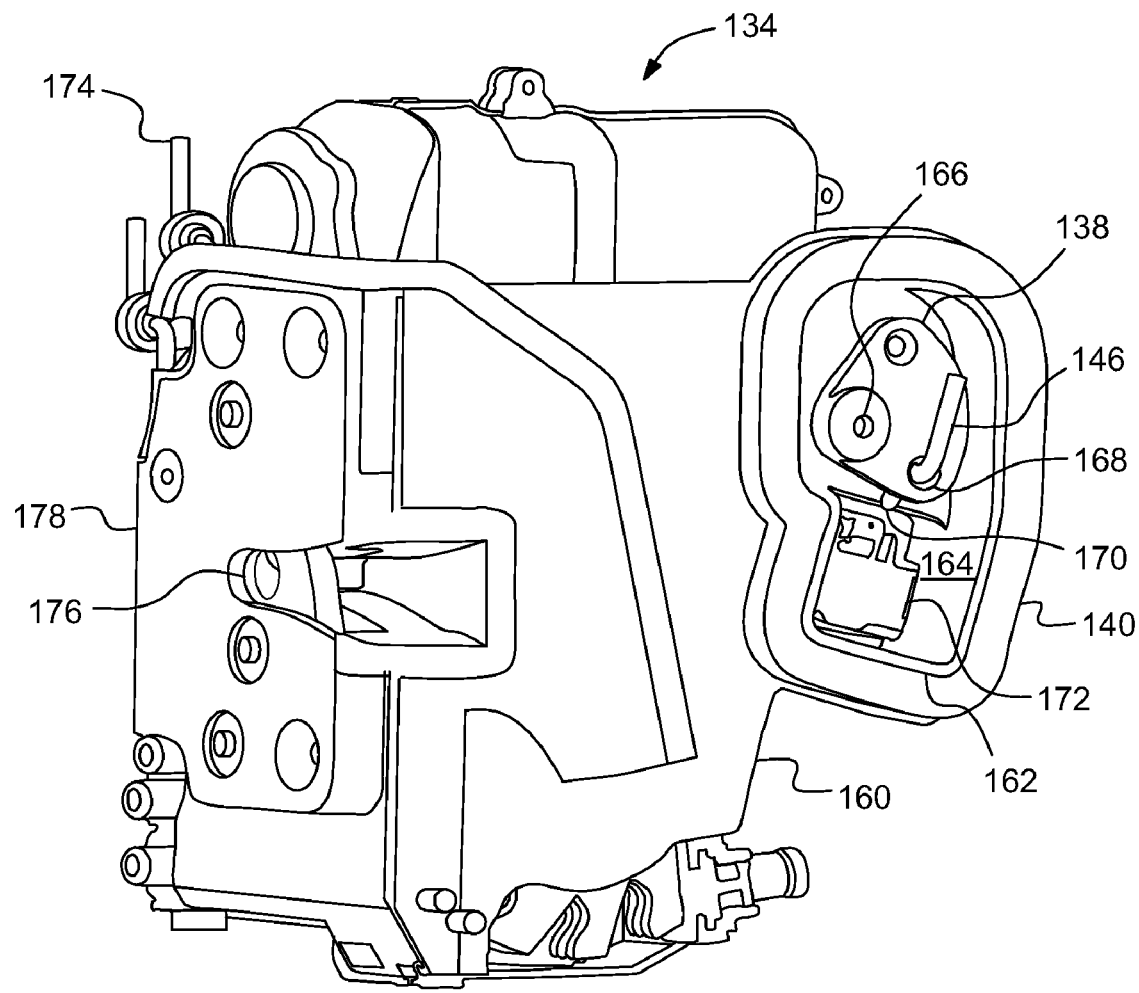
FIG. 3 is a perspective view of a door latch according to a second embodiment, with the latch locking lever in a locked position.
Figure 4:
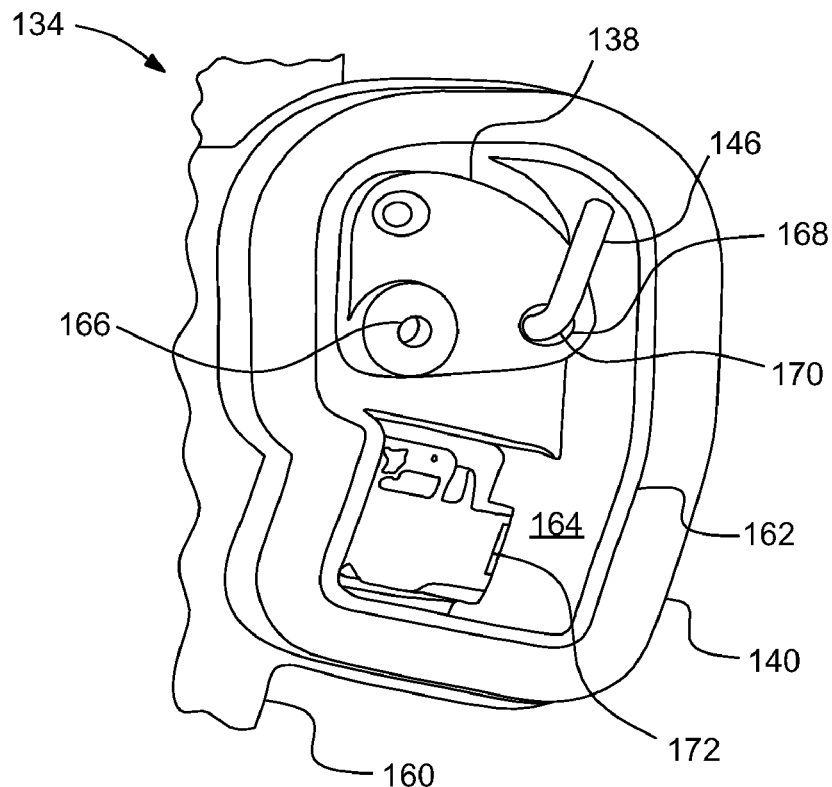
FIG. 4 illustrates a portion of the perspective view of FIG. 3, but showing the latch locking lever in an unlocked position.

FIGS. 3 and 4 illustrate a second embodiment of the invention. Since this embodiment is similar to the first, similar element numbers will be used for similar elements, but employing 100-series numbers. In this embodiment, the door latch 134 includes a latch housing 160 having a flange 162 extending inboard therefrom that forms a pass-through chamber 164. The flange 162 is continuous around the pass-through chamber 164 in order to assure that the pass-through chamber 164 is not exposed to water.

A latch locking lever 138 is located in the pass-through chamber 164 and is pivotally mounted to the door latch 134 at a pivot location 166. The latch locking lever 138 includes a first lock rod hole 168 spaced from the pivot location 166. An attachment end 170 of a sill lock rod 146 is mounted in the first lock rod hole 168. The sill lock rod 146 extends upward from the latch locking lever 138 toward an inside manual lock button (not shown in this embodiment). FIG. 3 shows the latch locking lever 138 and the sill lock rod 146 in the locked position, while FIG. 4 illustrates the latch locking lever 138 and the sill lock rod 146 in the unlocked position.

An electrical connector 172 is also located in the pass-through chamber 164, and so it also is shielded from water entering a door wet cavity. The electrical connector 172 is configured to connect to a wire harness (not shown), with this connection not being exposed to water in the door. Thus, the electrical connector 172 does not have to be designed to accommodate the wet environment of a door wet cavity.

A latch-to-inner panel seal 140 extends around the flange 162 and seals against a door inner panel (not shown in this embodiment) to ensure the water cannot pass from a door wet cavity to a door dry cavity or leak into the pass-through chamber 164. The door latch 134 may also include other features, such as, for example, other lock rods 174, a pivoting latch member 176 for holding the door closed and a mount 178 for mounting the door latch 134 to the door.

Figure 5:
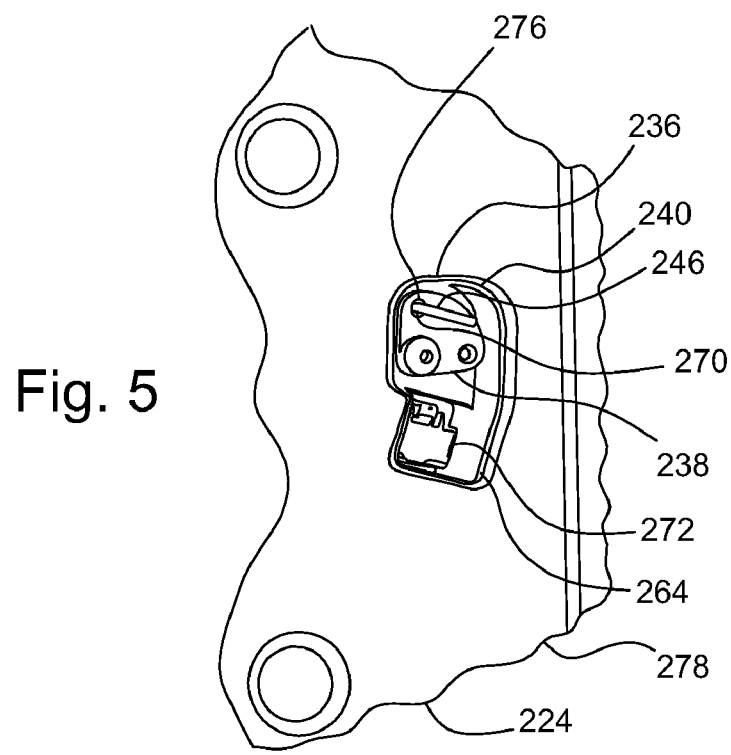
FIG. 5 is a perspective view of a portion of a door inner panel with a door latch mounted to it according to a third embodiment.

FIG. 5 illustrates a third embodiment of the present invention. Since this embodiment is similar to the second, similar element numbers will be used for similar elements, but employing 200-series numbers. In this embodiment, the sealing of a latch-to-inner panel seal 240 around the perimeter of an access hole 236 in a door inner panel 224 is the same as in the second embodiment. Also, the location of a latch locking lever 238 and an electrical connector 272 in a pass-through chamber 264 is the same as in the second embodiment. However, a second lock rod hole 276 in the latch locking lever 238 now retains an attachment end 270 of a horizontal lock rod 246. Even so, the latch locking lever 238, electrical connector 272 and the horizontal lock rod 246 are exposed to a dry cavity side 278 of the door inner panel 224, protected from water intrusion into the door.

While certain embodiments of the present invention have been described in detail, those familiar with the art to which this invention relates will recognize various alternative designs and embodiments for practicing the invention as defined by the following claims.

What is claimed is:

1. A vehicle door comprising:
   a door outer panel;
   a door inner panel affixed to the door outer panel and defining a door wet cavity therebetween, the door inner panel including an access hole;
   a door trim panel mounted to the door inner panel and defining a door dry cavity between the door trim panel and the door inner panel;
   a door latch located in the door wet cavity;
   a latch locking lever exposed to the door dry cavity and shielded from the door wet cavity, the latch locking lever operatively engaging the door latch;
   a lock rod having a first end attached to the latch locking lever, the lock rod extending through the access hole and between the door inner panel and the door trim panel toward a second end spaced from the latch locking lever, whereby the lock rod is not exposed to the door wet cavity; and a seal extending around a periphery of the access hole, the seal in sealing engagement with the door inner panel and the door latch, wherein the seal is spaced from the lock rod.

2. The vehicle door of claim 1 wherein the latch locking lever is inboard of the door inner panel in the door dry cavity.

3. The vehicle door of claim 1 wherein the lock rod is a sill lock rod that extends generally vertically to an inside manual lock button protruding through the door trim panel.

4. The vehicle door of claim 1 including an electrical connector mounted to the door latch, the electrical connector being adjacent to the access hole and the latch locking lever, exposed to the door dry cavity and shielded from the door wet cavity.

5. The vehicle door of claim 1 wherein the door latch includes a flange defining a pass-through chamber adjacent to the access hole and the seal extends around a periphery of the flange, and the latch locking lever being located in the pass-through chamber.

6. The vehicle door of claim 5 including an electrical connector mounted to the door latch, the electrical connector being adjacent to the access hole in the pass-through chamber, exposed to the door dry cavity and shielded from the door wet cavity.

7. A vehicle door comprising:
a door outer panel;
a door inner panel affixed to the door outer panel and defining a door wet cavity therebetween, the door inner panel including an access hole;
a door trim panel mounted to the door inner panel and defining a door dry cavity between the door trim panel and the door inner panel;
a door latch located in the door wet cavity;
a latch locking lever exposed to the door dry cavity and shielded from the door wet cavity, the latch locking lever operatively engaging the door latch; and
a lock rod having a first end attached to the latch locking lever, the lock rod extending through the access hole and between the door inner panel and the door trim panel toward a second end spaced from the latch locking lever, whereby the lock rod is not exposed to the door wet cavity, the lock rod being a sill lock rod that extends generally vertically to an inside manual lock button protruding through the door trim panel.

8. The vehicle door of claim 7 including a seal extending around a periphery of the access hole, the seal in sealing engagement with the door inner panel and the door latch.

9. The vehicle door of claim 7 wherein the door latch includes a flange defining a pass-through chamber adjacent to the access hole and a seal extending around a periphery of the flange, the seal in sealing engagement with the door inner panel and the door latch, and the latch locking lever being located in the pass-through chamber.

10. The vehicle door of claim 9 including an electrical connector mounted to the door latch, the electrical connector being adjacent to the access hole in the pass-through chamber, exposed to the door dry cavity and shielded from the door wet cavity.

11. A vehicle door comprising:
a door outer panel;
a door inner panel affixed to the door outer panel and defining a door wet cavity therebetween, the door inner panel including an access hole;
a door trim panel mounted to the door inner panel and defining a door dry cavity between the door trim panel and the door inner panel;
a door latch located in the door wet cavity, the door latch including a flange defining a pass-through chamber adjacent to the access hole and a seal extending around a periphery of the flange, the seal in sealing engagement with the door inner panel and the door latch;
a latch locking lever exposed to the door dry cavity and shielded from the door wet cavity, the latch locking lever operatively engaging the door latch and being located in the pass-through chamber; and
a lock rod having a first end attached to the latch locking lever, the lock rod extending through the access hole and between the door inner panel and the door trim panel toward a second end spaced from the latch locking lever, whereby the lock rod is not exposed to the door wet cavity.

12. The vehicle door of claim 11 wherein the seal is spaced from the lock rod.

13. The vehicle door of claim 11 wherein the lock rod is a sill lock rod that extends generally vertically to an inside manual lock button protruding through the door trim panel.

14. The vehicle door of claim 13 including an electrical connector mounted to the door latch, the electrical connector being adjacent to the access hole in the pass-through chamber, exposed to the door dry cavity and shielded from the door wet cavity.

* * * * *